United States Patent
Kim et al.

(10) Patent No.: US 11,593,588 B2
(45) Date of Patent: Feb. 28, 2023

(54) ARTIFICIAL INTELLIGENCE APPARATUS FOR GENERATING TRAINING DATA, ARTIFICIAL INTELLIGENCE SERVER, AND METHOD FOR THE SAME

(71) Applicant: LG Electronics Inc., Seoul (KR)

(72) Inventors: Jaehong Kim, Seoul (KR); Hyoeun Kim, Seoul (KR); Hyejeong Jeon, Seoul (KR); Heeyeon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 689 days.

(21) Appl. No.: 16/593,928

(22) Filed: Oct. 4, 2019

(65) Prior Publication Data

US 2020/0034661 A1 Jan. 30, 2020

(30) Foreign Application Priority Data

Aug. 27, 2019 (KR) .................. 10-2019-0105181

(51) Int. Cl.
*G06Q 30/00* (2012.01)
*G06K 9/62* (2022.01)
*G06N 20/00* (2019.01)
*G06N 5/04* (2006.01)
*G06N 3/08* (2006.01)

(52) U.S. Cl.
CPC ......... *G06K 9/6256* (2013.01); *G06K 9/6215* (2013.01); *G06N 3/08* (2013.01); *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2019/0095793 A1* | 3/2019 | Fink | A61B 5/7264 |
| 2019/0302766 A1* | 10/2019 | Mondello | G05D 1/0246 |
| 2019/0382030 A1* | 12/2019 | Hotson | B60W 30/02 |
| 2019/0385313 A1* | 12/2019 | Cavallo | G06T 7/246 |
| 2022/0021469 A1* | 1/2022 | Veijalainen | H04L 43/022 |

* cited by examiner

*Primary Examiner* — Matthew T Sittner
(74) *Attorney, Agent, or Firm* — Fish & Richardson P.C.

(57) ABSTRACT

An artificial intelligence apparatus for generating training data includes a memory configured to store a target artificial intelligence model, and a processor configured to receive sensor data, determine whether the received sensor data is irrelevant to a learning of the target artificial intelligence model, determine whether the received sensor data is useful for the learning if the received sensor data is determined to be relevant to the learning, extract a label from the received sensor data by using a label extractor if the received sensor data is determined to be useful for the learning, determine a confidence level of the extracted label, and generate training data including the received sensor data and the extracted label if the determined confidence level exceeds a first reference value.

16 Claims, 14 Drawing Sheets

FIG. 7
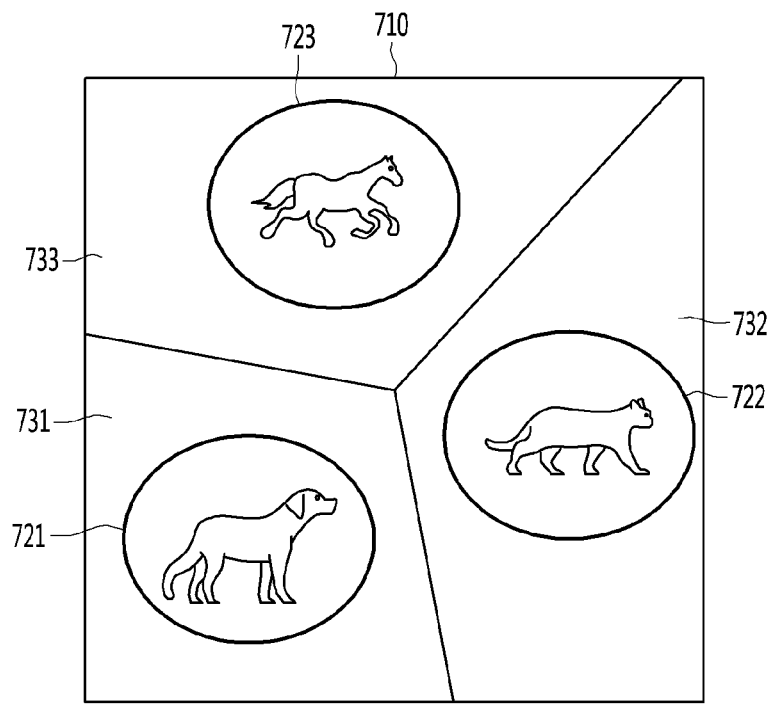
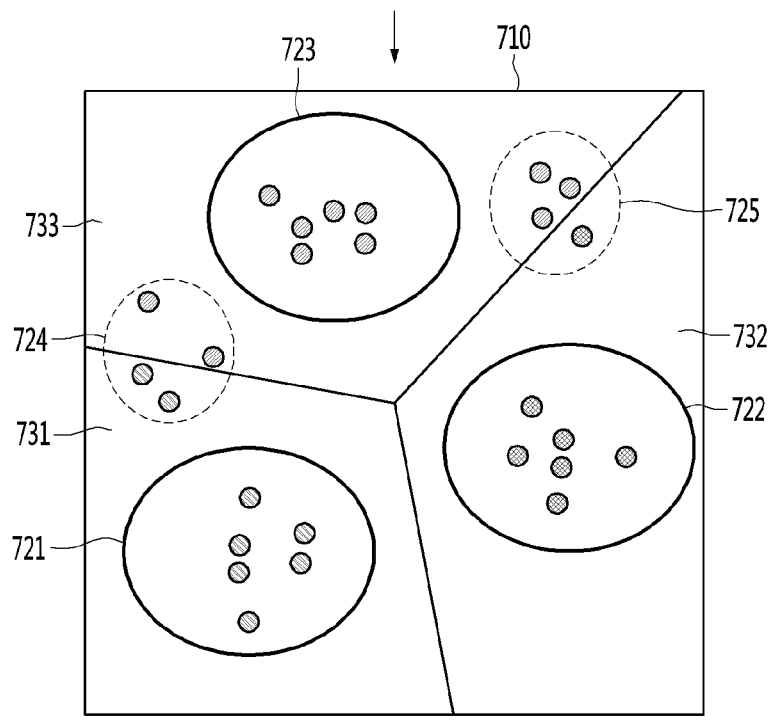

FIG. 8
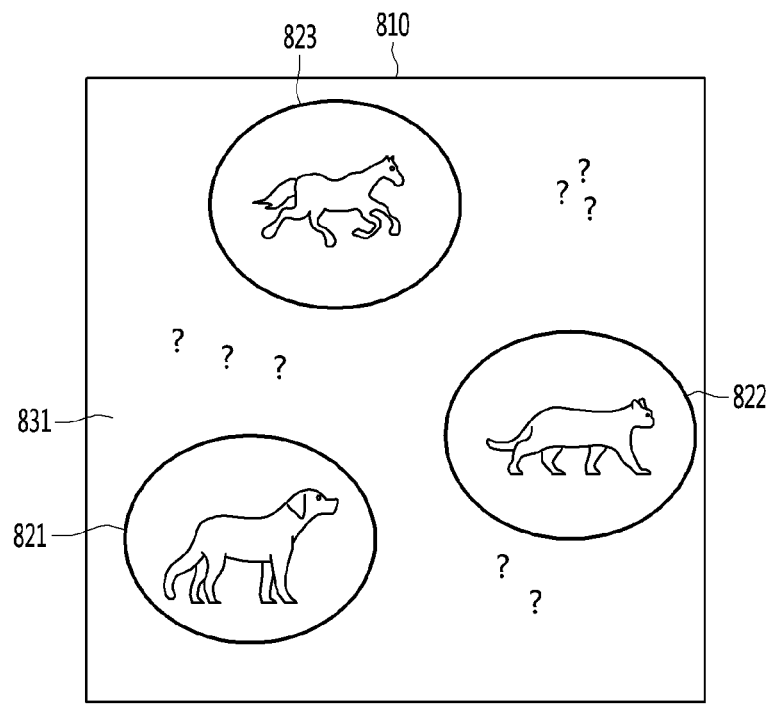
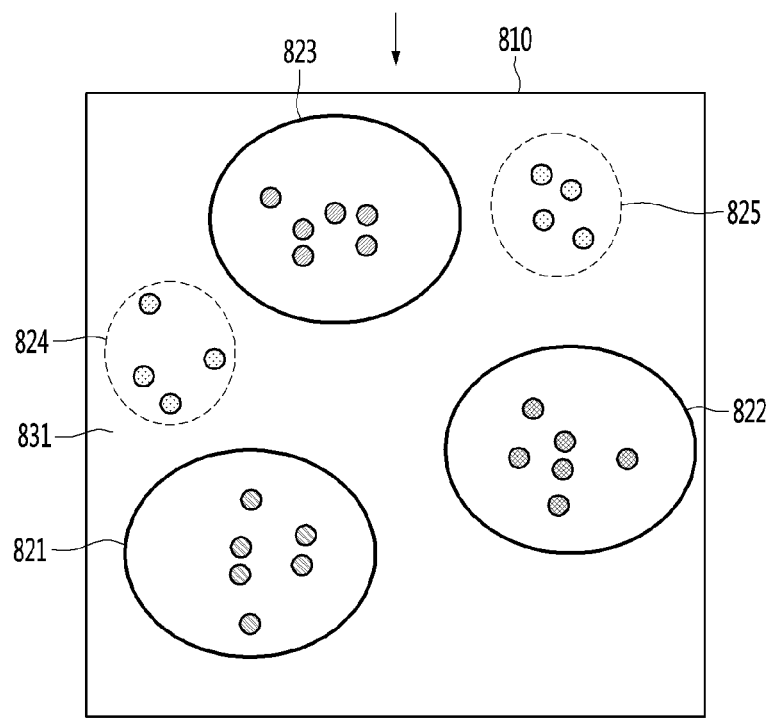

FIG. 10
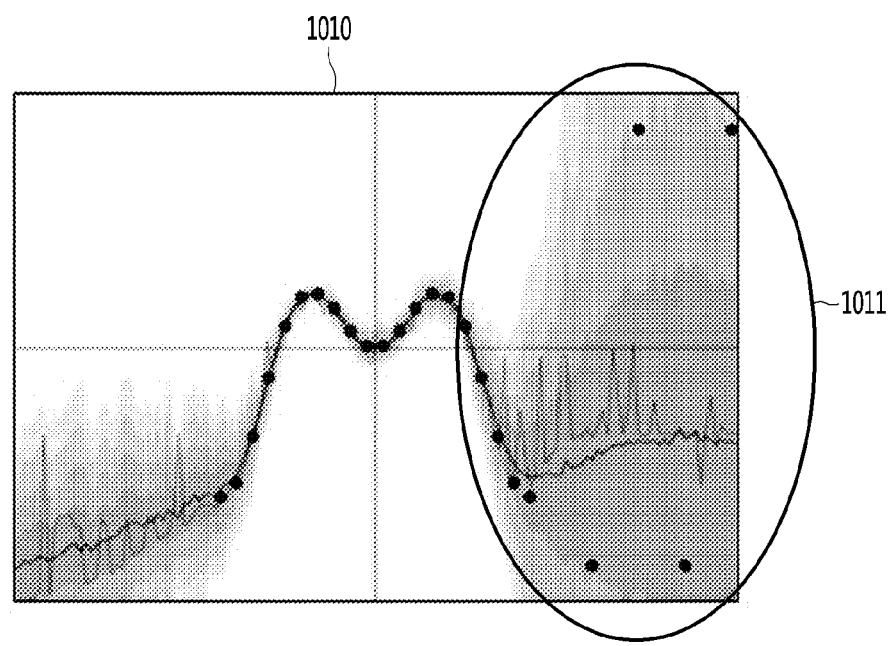
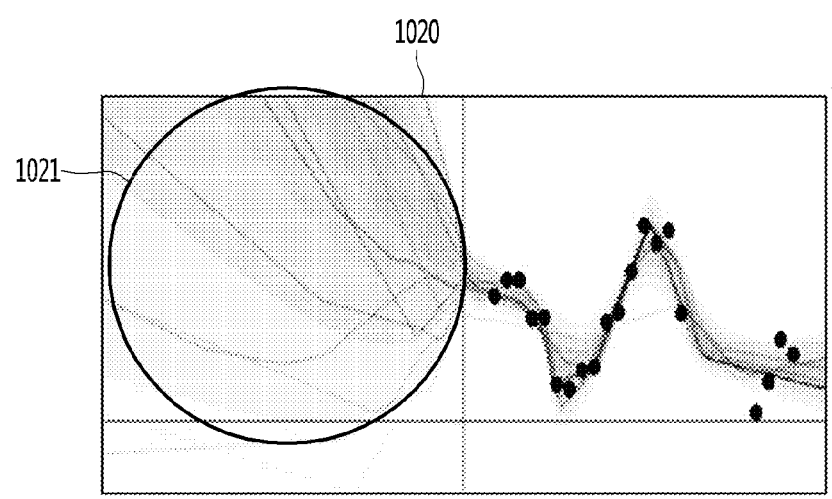

ARTIFICIAL INTELLIGENCE APPARATUS FOR GENERATING TRAINING DATA, ARTIFICIAL INTELLIGENCE SERVER, AND METHOD FOR THE SAME

CROSS-REFERENCE TO RELATED APPLICATIONS

The present application claims the benefits of priority to Korean Patent Application No. 10-2019-0105181 filed on Aug. 27, 2019, which is herein incorporated by reference in its entirety.

BACKGROUND

The disclosure relates to an artificial intelligence apparatus for generating training data, an artificial intelligence server, and a method for the same. Specifically, the disclosure relates to an artificial intelligence apparatus for determining whether data is suitable for a learning of a target artificial intelligence model among data collected in a real environment and adding labeling data to the data suitable for the learning to generate training data, an artificial intelligence server, and a method for the same.

The research and application of artificial intelligence (AI) by using a deep learning algorithm has been actively conducted. AI models based on the deep learning algorithm are learned by using training data. The training data includes labeling data, and the labeling data serves as a correct answer to the result inferred from the AI model.

In order for the AI model to be accurately learned, the training data must include accurate labeling data. Currently, a person (e.g., an administrator, etc.) directly determines the labeling data to be included in the training data. Therefore, a large amount of human resources are required to generate training data from massive data, and there is a problem in that training data must be generated manually by human effort.

SUMMARY

An aspect of the disclosure is to provide an AI apparatus for automatically generating training data capable of being used for a learning of a target AI model by using sensor data collected in a real environment, an AI server, and a method for the same.

Another aspect of the disclosure is to provide an AI apparatus for effectively storing the generated training data with a small capacity, an AI server, and a method for the same.

One embodiment of the disclosure provides an artificial intelligence apparatus, an artificial intelligence server, and a method for the same, which receive sensor data, determine whether the received sensor data is irrelevant to a learning of a target artificial intelligence model, whether the received sensor data is useful for the learning of the target artificial intelligence model, and whether a label extracted from the received sensor data has a high confidence level, and generate training data including received sensor data and the extracted label based on the determination result.

One embodiment of the disclosure also provides an artificial intelligence apparatus, an artificial intelligence server, and a method for the same, which determine whether the received sensor data is irrelevant to the learning of the target artificial intelligence mode by determining whether the object of interest of the artificial intelligence model is included in the received sensor data using the open set recognition model.

One embodiment of the disclosure also provides an artificial intelligence apparatus, an artificial intelligence server, and a method for the same, which calculate the aleatoric uncertainty and the epistemic uncertainty of the received sensor data using the target AI model, and use the calculated result to determine whether the received data is irrelevant to the learning of the target artificial intelligence model.

One embodiment of the disclosure also provides an artificial intelligence apparatus, an artificial intelligence server, and a method for the same, which determine the confidence level of the label extracted from the received sensor data by comparing a position where the received sensor data is mapped in the feature space with a position in the feature space of the class having the same label as the label extracted from the received sensor data.

The details of one or more embodiments are set forth in the accompanying drawings and the description below. Other features will be apparent from the description and drawings, and from the claims.

BRIEF DESCRIPTION OF THE DRAWINGS

FIG. 7 is a view illustrating an example of a classification model.

FIG. 8 is a view illustrating an example of an open set recognition model according to an embodiment.

FIG. 10 is a view for describing aleatoric uncertainty and epistemic uncertainty.

DETAILED DESCRIPTION OF THE EMBODIMENTS

Figure 1:
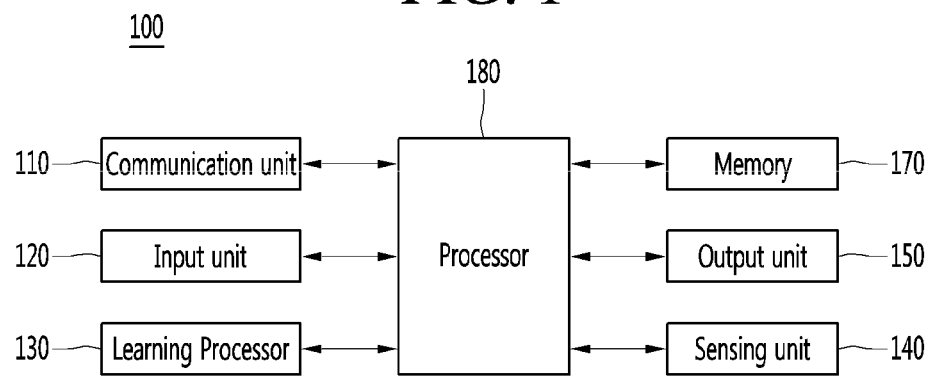
FIG. 1 is a block diagram illustrating an AI apparatus according to an embodiment.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<EXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment.

Hereinafter, the AI apparatus 100 may be referred to as a terminal.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other devices 100*a* to 100*e* and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

Here, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a training data for model learning and an input data to be used when an output is acquired by using learning model. The input unit 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing unit 140 may acquire at least one of internal information about the AI apparatus 100, ambient environment information about the AI apparatus 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

Here, the output unit 150 may include a display for outputting time information, a speaker for outputting auditory information, and a haptic module for outputting haptic information.

The memory 170 may store data that supports various functions of the AI apparatus 100. For example, the memory 170 may store input data acquired by the input unit 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
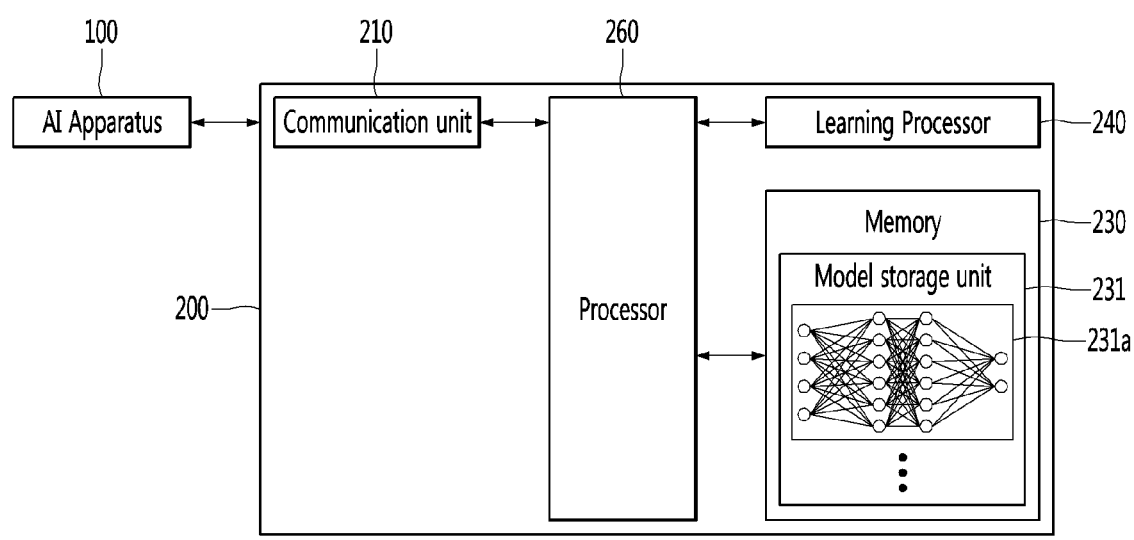
FIG. 2 is a block diagram illustrating an AI server according to an embodiment.

FIG. 2 is a block diagram illustrating an AI server 200 according to an embodiment.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage 231. The model storage 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
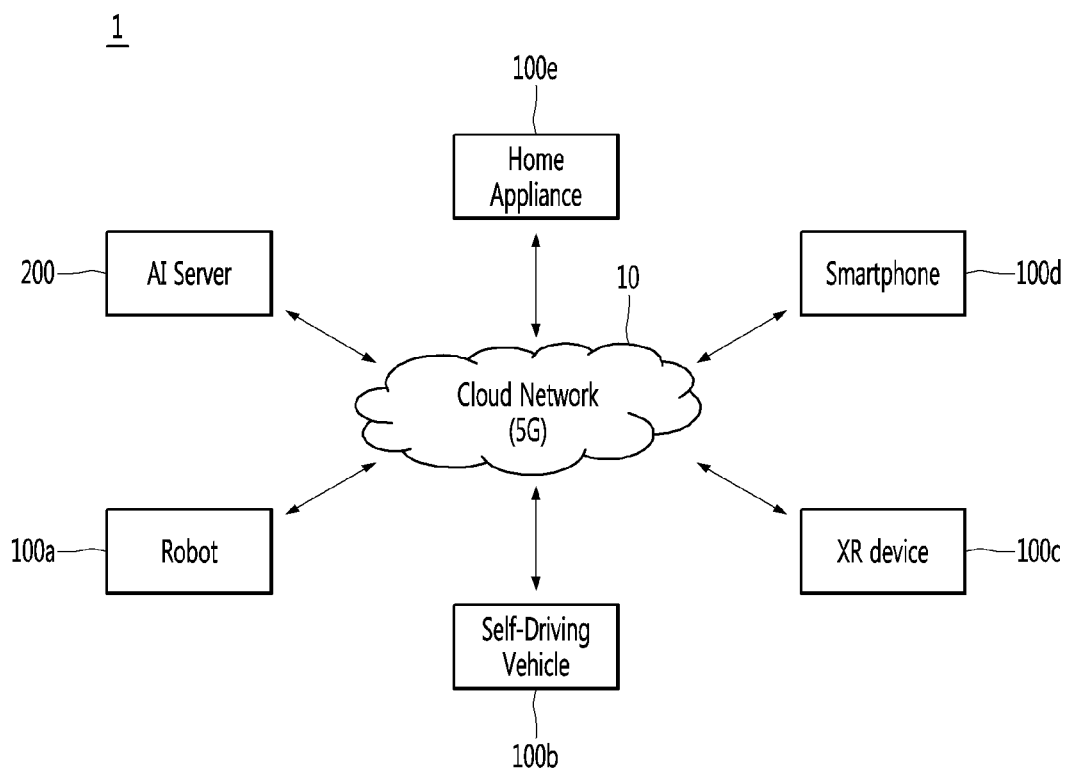
FIG. 3 is a view illustrating an AI system according to an embodiment.

FIG. 3 is a view illustrating an AI system 1 according to an embodiment.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

Here, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. Here, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling route by using the recognized surrounding information or object information. The learning model may be learned directly from the self-driving vehicle 100a or may be learned from an external device such as the AI server 200.

Here, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external device to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. Here, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

Here, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given route without the user's control or moves for itself by determining the route by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

Here, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driving unit is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
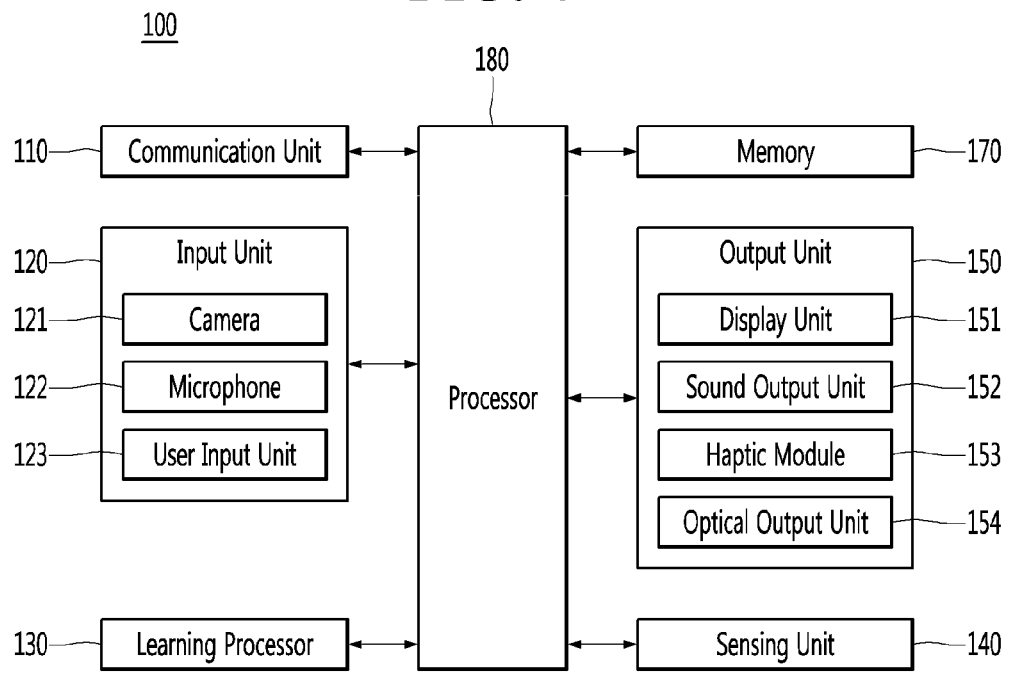
FIG. 4 is a block diagram illustrating an AI apparatus according to an embodiment.

FIG. 4 is a block diagram illustrating an AI apparatus 100 according to an embodiment.

The redundant repeat of FIG. 1 will be omitted below.

Hereinafter, the AI communication unit 110 may also be referred to as a communicator.

Referring to FIG. 4, the input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the AI apparatus 100 to correspond to the inputted information.

The user input unit 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The sensing unit 140 may also be referred to as a sensor unit.

The sensor unit 140 may include at least one of a temperature sensor for measuring an ambient temperature or a humidity sensor for measuring an ambient humidity.

The output unit 150 may include at least one of a display 151, a sound output module 152, a haptic module 153, or an optical output module 154.

The display 151 may display (output) information processed in the AI apparatus 100. For example, the display 151 may display execution screen information of an application program running on the AI apparatus 100 or user interface (UI) and graphic user interface (GUI) information according to such execution screen information.

The display 151 may be formed with a mutual layer structure with a touch sensor or formed integrally, so that a touch screen may be implemented. Such a touch screen may serve as the user input unit 123 providing an input interface between the AI apparatus 100 and a user, and an output interface between the AI apparatus 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

Figure 5:
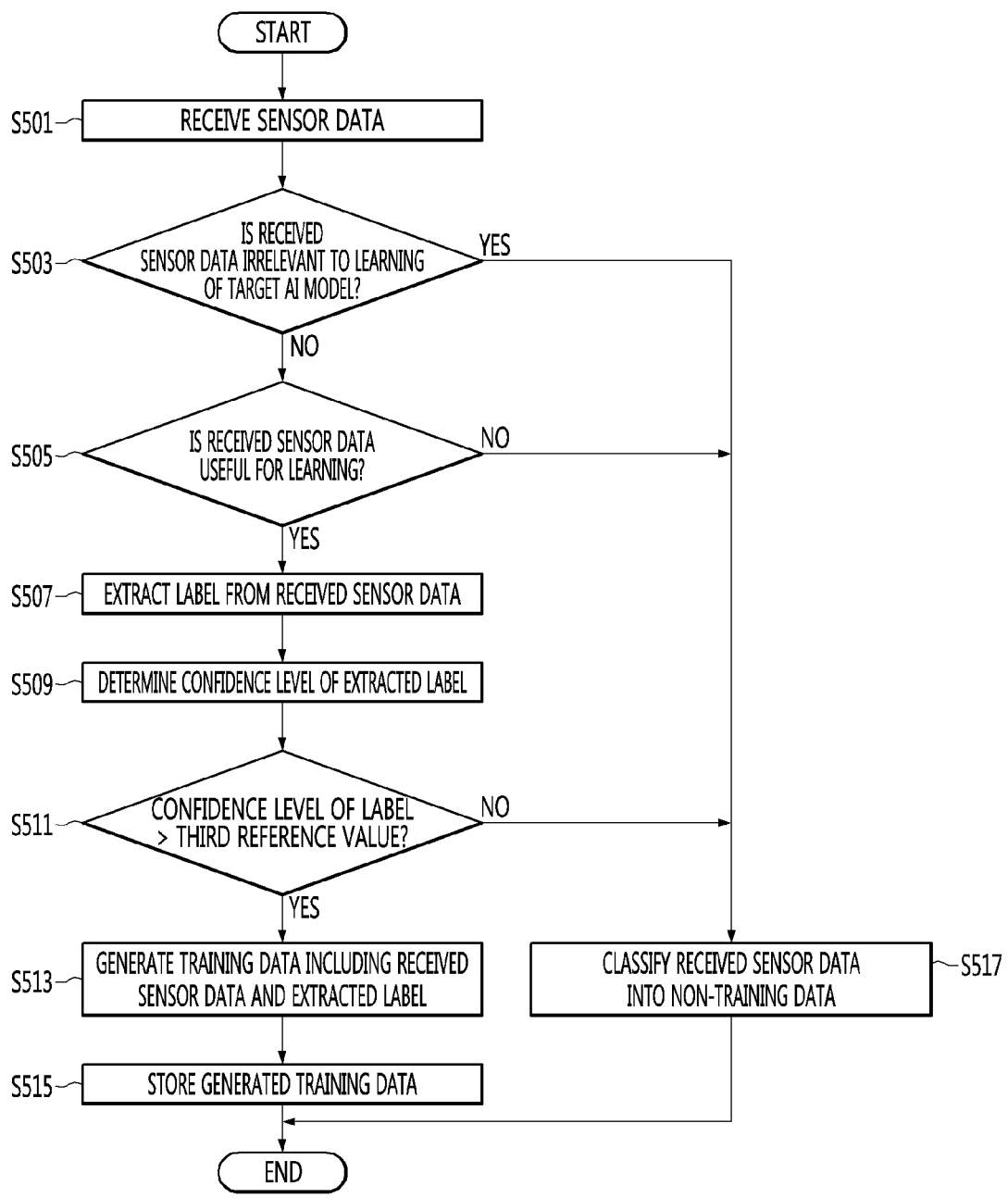
FIG. 5 is a flowchart illustrating a method for generating training data, according to an embodiment.

FIG. 5 is a flowchart illustrating a method for generating training data, according to an embodiment.

Referring to FIG. 5, the processor 180 of the AI apparatus 100 receives sensor data (S501).

The sensor data refers to sensor data collected in a real environment, and may be collected by the sensor unit 140 of the AI apparatus 100 or the sensor unit of the external device. The processor 180 may receive sensor data from the sensor unit 140, or may receive sensor data acquired by the sensor unit of the external device through the communication unit 110.

The external device may refer to a device separate from the AI apparatus 100 that generates the training data, and may include another AI apparatus 100, a sensor device, and an Internet of Things (IoT) device.

The sensor data is data generated from an external stimulus and may include sound data or image data. In other words, a microphone or a camera may be regarded as a sensor.

The processor 180 of the AI apparatus 100 determines whether the received sensor data is irrelevant to the learning of the target AI model (S503).

Determining whether the received sensor data is irrelevant to the learning of the target AI model may mean performing primary filtering on the received sensor data.

The target AI model refers to an AI model to be learned by using the training data to be generated. The target AI model includes an artificial neural network and may be learned by using a machine learning algorithm or a deep learning algorithm. The target AI model may be stored in the memory 170.

If the received sensor data is not the same kind as data inputted or outputted to the target AI model, the processor 180 may determine that the received sensor data is data irrelevant to the learning of the target AI model. If the object of interest of the target AI model is not included in the received sensor data, the processor 180 may determine that the received sensor data is data irrelevant to the learning of the target AI model. The object of interest may refer to an object that is identifiable or recognizable by the target AI model.

The processor 180 may determine whether the received sensor data includes the object of interest of the target AI model by using an open set recognition model. The open set recognition model may output a result that an unknown object has been recognized if the input data does not include an object that is not a recognizable object. If it is determined that only the unknown object is included in the received sensor data, the processor 180 may determine that the received sensor data is data irrelevant to the learning of the target AI model.

In the case in which the target AI model is a classification model or a recognition model, if the received sensor data is inputted, the target AI model may output which class the target belongs to is included in the inputted sensor data. In this case, classes or objects that can be classified or recognized by the target AI model may be referred to as an object of interest. That is, the processor 180 may determine whether the sensor data received by using the open set recognition model includes an object corresponding to a class that can be classified or recognized by the target AI model. If the object corresponding to the class that can be classified or recognized is not included, the processor 180 may determine that the received sensor data is irrelevant to the learning of the target AI model.

For example, when it is assumed the target AI model is a model that recognizes whether the object included in image data is a dog or a cat, the target AI model may only output the result that the object is the dog or the cat even if image data including a rabbit is inputted. However, since the image data including the rabbit is not the dog or the cat which is the object of interest of the target AI model, the processor 180 may determine that the image data is irrelevant to the learning of the target AI model.

The open set recognition model may be previously learned by the external AI apparatus 100 or the AI server 200 and stored in the memory 170, or may be learned through the processor 180 or the learning processor 130 and stored in the memory 170. The open set recognition model includes an artificial neural network and may be learned by using a machine learning algorithm or a deep learning algorithm.

For example, the open set recognition model may map an object included in the inputted sensor data into a feature space, calculate a distance between the mapped position and the closest recognizable class, and output a result that the object is an unknown object if the distance exceeds a reference value set to the corresponding class. The open set recognition model is merely an example and may be configured in various ways.

In one embodiment, it is assumed that the AI apparatus 100 is a speech recognizer, the target AI model is a Korean speech recognition model, and the received sensor data is speech data. The Korean speech recognition model classifies speech from speech data on a Korean phoneme basis and recognize the speech. If the speech data includes a language other than Korean, the Korean speech recognition model should not classify the speech included in the speech data into Korean phonemes. In this case, the processor 180 may distinguish whether the speech included in the speech data is Korean or a foreign language by using the open set recognition model corresponding to the Korean speech recognition model. The processor 180 may determine the speech data including the foreign language as data irrelevant to the learning of the Korean speech recognition model. The processor 180 may determine the entire speech data including at least part of a foreign language as data irrelevant to the learning of the Korean speech recognition model, but the processor 180 may determine distinguish only part of the speech data including the foreign language and determine the same as data irrelevant to the learning of the Korean speech recognition model.

In one embodiment, it is assumed that the AI apparatus 100 is a robot cleaner, the target AI model is an obstacle recognition model, and the received sensor data is image data. The obstacle recognition model may recognize the object included in the image data by classifying the object into one of predetermined classes. For example, the predetermined classes may include the user's body (e.g., hands, feet, face, etc.), furniture (e.g., chairs, sofas, desk legs, chair legs, etc.), home appliances (e.g., air cleaner, air conditioners, refrigerators, fans, etc.), and pets. If the image data includes an object (e.g., a ball, a garbage, etc.) that do not belong to the predetermined classes, the obstacle recognition model should not classify the object included in such image data into one of the predetermined classes. In this case, the processor 180 may distinguish whether an object included in the image data belongs to one of four predetermined classes by using the open set recognition model corresponding to the image recognition model, and may determine image data including an unknown object as data irrelevant to the learning of the obstacle recognition model. The processor 180 may determine the entire image data including at least one unknown object as data irrelevant to the learning of the obstacle recognition model, but may distinguish only part of the image data including the unknown object and determine the same as data irrelevant to the learning of the obstacle recognition model. Part of the image data may refer to part of the region of the image data corresponding to one frame. If it is determined in step S503 that the received sensor data is relevant to the learning of the target AI model, the processor 180 of the AI apparatus 100 determines whether the received sensor data is useful for learning. (S505).

Determining whether the received sensor data is useful for the learning of the target AI model may mean performing secondary filtering on the received sensor data.

The processor 180 may use the target AI model to calculate uncertainty for sensor data determined to be relevant to the learning of the target AI model, and may determine whether the received sensor data is useful for the learning, based on the calculated uncertainty. Specifically, the processor 180 may generate a result by using the target AI model with respect to the sensor data determined to be relevant to the learning of the target AI model, calculate uncertainty about the generated result, and determine whether the sensor data is useful for the learning of the target AI model, based on the calculated uncertainty.

The uncertainty of the result generated by using the target AI model may be increased due to noise included in the sensor data itself used to generate the result, or the target AI model which is insufficiently learned by using data similar to the sensor data. The former uncertainty may be referred to as aleatoric uncertainty and the latter uncertainty may be referred to as epistemic uncertainty.

The aleatoric uncertainty refers to randomness or noise that occurs during the data generation process. Therefore, the aleatoric uncertainty is an uncertainty that cannot be eliminated even if a large amount of data is used to train the AI model. Meanwhile, the epistemic uncertainty refers to an uncertainty caused by an incomplete model. Therefore, the epistemic uncertainty is an uncertainty that can be eliminated by training an AI model using a large amount of data. That is, sensor data with high aleatoric uncertainty may not be useful for the learning of the target AI model, and sensor data with high epistemic uncertainty may be useful for the learning of the target AI model.

Therefore, the processor 180 may calculate the aleatoric uncertainty and the epistemic uncertainty about the received sensor data by using the target AI model. If the calculated aleatoric uncertainty is less than a first reference value and the calculated epistemic uncertainty is greater than a second reference value, the processor 180 may determine that the corresponding sensor data is useful for the learning of the target AI model.

That is, even if the epistemic uncertainty is high, if the aleatoric uncertainty is high, a large amount of noise may be included in the sensor data. Therefore, this may adversely affect the learning of the target AI model. Meanwhile, even if the aleatoric uncertainty is low, if the epistemic uncertainty is low, it is data including the contents that have already been sufficiently learned. Therefore, this may not adversely affect the learning of the target AI model. Accordingly, the processor 180 may determine that the sensor data having high epistemic uncertainty and low aleatoric uncertainty is data useful for the learning of the target AI model.

The processor 180 may generate a result from the received sensor data by using the target AI model, and determine the noise observed in the generated result as the aleatoric uncertainty of the received sensor data. That is, the aleatoric uncertainty of the received sensor data may refer to Gaussian noise included in the sensor data.

The processor 180 may generate a plurality of results from the received sensor data through dropout variational inference with respect to the target AI model, and determine the variance of the plurality of generated results as epistemic uncertainty of the received sensor data. In detail, the processor 180 may generate a result from sensor data received by randomly activating or deactivating hidden nodes included in a hidden layer of the target AI model by using a dropout technique, calculate the variance of a plurality of results generated by using the target AI model with various combinations of activation or deactivation of the hidden nodes, and determine epistemic uncertainty about the received sensor data.

The dropout technique is a technique for preventing overfitting by randomly deactivating hidden nodes in a learning stage of an artificial neural network. The dropout technique does not apply to an operation of inferring the result from the learned artificial neural network. However, in the disclosure, the dropout technique is applied in the inference operation of the target AI model to generate results in a state in which the hidden nodes of the target AI model are randomly deactivated, and calculates or determines the epistemic uncertainty of the received data in consideration of the distribution of the generated results.

The processor 180 of the AI apparatus 100 extracts a label from the received sensor data (S507).

An object of the disclosure is to generate training data used to train the target AI model from the sensor data collected in the real environment. The training data includes sensor data and a label corresponding to the sensor data. Therefore, the target AI model may be learned by supervised learning using the generated training data.

The label extracted from the sensor data refers to the result, that is, the correct answer, which should be derived from the sensor data in the target AI model. For example, if the target AI model is a model for identifying an object from image data and the sensor data is image data about a cat, the label for the sensor data may be a "cat", a predetermined scalar or vector corresponding to the cat, or the like.

The processor 180 may extract a label from sensor data by using a label extractor corresponding to the target AI model. The label extractor may be configured to include an artificial neural network, and may be learned by using a machine learning algorithm or a deep learning algorithm.

The label extractor may be a label extraction model based on semi-supervised learning. In detail, the label extractor may be a model configured to extract a label of the training data received from the existing training data including the label by using a domain adaptation (DA) technique.

The processor 180 of the AI apparatus 100 determines a confidence level of the extracted label (S509).

The processor 180 may calculate the similarity or proximity between the sensor data labeled by the user and the sensor data labeled by the label extractor, and determine a confidence level of the label from which the calculated similarity or the calculated proximity is extracted. The processor 180 may determine the confidence level of the extracted label to be higher as the calculated similarity or the calculated proximity increases.

The processor 180 may determine the confidence level of the extracted label based on the positional relationship in the feature space between the sensor data labeled by the user and the sensor data labeled by the label extractor.

The processor 180 may calculate a Frechet Inception Distance (FID) with respect to the sensor data labeled by the label extractor, and determine the confidence level of the extracted label as the FID is smaller. Alternatively, the processor 180 may calculate L2-norm from the sensor data labeled by the label extractor to the corresponding label class in the feature space, and determine the confidence level of the extracted label to be higher as the calculated L2-norm is smaller. Alternatively, the processor 180 may calculate Kullback-Leibler divergence (KL-divergence) with respect to the sensor data labeled by the label extractor, and determine the confidence level of the extracted label to be higher as the calculated KL-divergence is smaller.

For example, if the label extractor extracts the label "cat" from the received sensor data, the processor 180 may calculate a distance between a position where the sensor data with the label "cat" is mapped to the feature space and a position where the received sensor data is mapped to the feature space by a user's setting. As the distance is shorter, the confidence level of the extracted label is higher.

The processor 180 of the AI apparatus 100 determines whether the determined confidence level exceeds a third reference value (S511).

Determining whether the confidence level of the label extracted from the received sensor data exceeds the third reference value may mean performing tertiary filtering on the received sensor data.

If it is determined in step S511 that the determined confidence level exceeds the third reference value, the processor 180 of the AI apparatus 100 generates training data including the received sensor data and the extracted label (S513).

If the confidence level determined with respect to the extracted label is determined to be high, it may mean that the label extracted by the label extractor is similar to the label set by the user. Therefore, if the extracted label has a high confidence level, the extracted label may be used to generate training data having a high confidence level.

The processor 180 of the AI apparatus 100 stores the generated training data (S515).

The processor 180 may store the generated training data itself in the memory 170, but may store, in the memory 170, a generative model capable of reproducing the generated training data, instead of the generated training data.

If the generated training data itself is stored in the memory 170, the received sensor data can be stored accurately, but it is inefficient in that it requires a large amount of storage space. However, if the generated model capable of reproducing the generated training data is learned and the learned generative training model is stored in the memory 170 instead of the generated training data, a large amount of training data can be reproduced with high accuracy with less capacity.

To this end, the processor 180 may learn the generative model that reproduces the generated training data. The generative model includes an artificial neural network and may be learned by using a machine learning algorithm or a deep learning algorithm. In detail, the generative model includes one of a generative adversarial network (GAN), a conditional GAN (cGAN), an auto-encoder, or a variational auto-encoder (VAE).

However, if the existing learned generative model is learned to reproduce the newly generated training data, newly generated training data is reproduced with high accuracy, but there may occur a problem in that previous training data that could be reproduced previously cannot be reproduced well. In order to solve this problem, the processor 180 may reproduce previous training data corresponding to the previous learning task of the generative model by using the generative model, and learn the generated model by using the reproduced previous training data and the generated training data.

If it is determined in step S503 that the received sensor data is irrelevant to the learning of the target AI model, the processor 180 of the AI apparatus 100 classifies the received sensor data into non-training data (S517).

If it is determined in step S505 that the received sensor data is not useful for the learning of the target AI model, the processor 180 of the AI apparatus 100 classifies the received sensor data into non-training data (S517).

If it is determined in step S511 that the confidence level of the extracted label does not exceed the third reference value, the processor 180 of the AI apparatus 100 classifies the received sensor data into non-training data (S517).

The non-training data refers to data that is not currently used for the learning of the target AI model. The processor 180 may determine that the non-training data is not required for the current learning and delete the non-training data without storing the non-training data, but may store the non-training data in the memory 170 or the like with the possibility of future use.

In one embodiment, the processor 180 may determine whether to store the sensor data based on the state of the sensor data, even if the sensor data is classified into non-training data. For example, the processor 180 may delete data irrelevant to the learning of the target AI model among the received sensor data. For example, the processor 180 may delete data relevant to the learning of the target AI model and having aleatoric uncertainty greater than or equal to the first reference value among the received sensor data. For example, the processor 180 may store, in the memory 170, data relevant to the learning of the target AI model and having epistemic uncertainty less than or equal to the second reference value among the received sensor data, without deleting the data. For example, the processor 180 may delete data whose accuracy of the extracted label is less than or equal to the third reference value among the received sensor data, or may store only the received sensor data in the memory 170 without deleting the data by excluding the extracted label.

Figure 6:
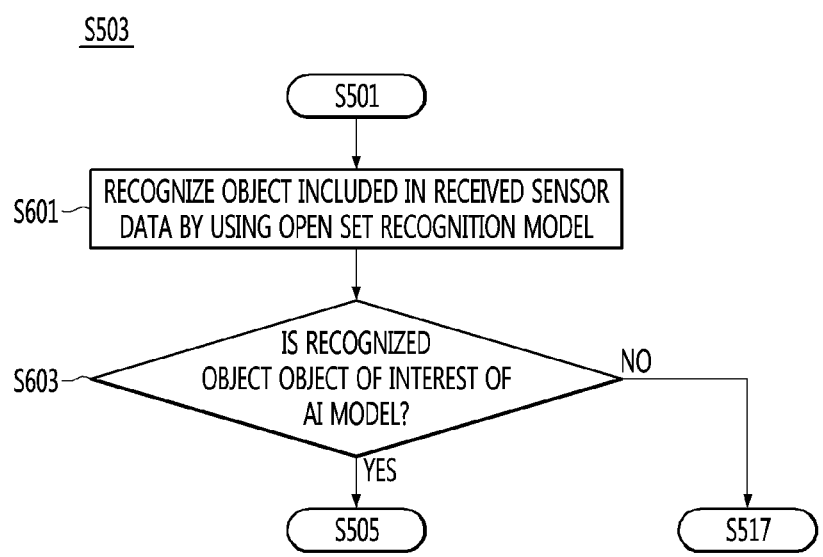
FIG. 6 is a flowchart illustrating an example of step S503 of determining whether received sensor data is irrelevant to a learning of a target AI model illustrated in FIG. 5.

FIG. 6 is a flowchart illustrating an example of step S503 of determining whether the received sensor data is irrelevant to the learning of the target AI model illustrated in FIG. 5.

Referring to FIG. 6, the processor 180 of the AI apparatus 100 recognizes an object included in the received sensor data by using the open set recognition model corresponding to the target AI model (S601).

As described above, the open set recognition model corresponding to the target AI model may recognize an object of interest for the target AI model included in the received sensor data. If the received sensor data includes an object that is different from the object of interest for the target AI model, the result that an unknown object is included may be outputted.

The object includes not only an object in reality but also various items such as sounds. Therefore, even if the received sensor data is sound data, the open set recognition model may determine whether the received sensor data includes a speech (or a phoneme, a word, etc.) that cannot be recognized by the AI model. The speech (or the phoneme, the word, etc.) that cannot be recognized by the target AI model may be referred to as an unknown object.

The processor 180 of the AI apparatus 100 determines whether the recognized object is an object of interest of the target AI model (S603).

As described above, the object of interest of the target AI model refers to a class or an object that can be recognized, classified, or identified in the target AI model. That is, the processor 180 determines whether the sensor data acquired by using the open set recognition model includes an object that can be recognized, classified, or identified by the target AI model.

If the recognized object does not exist, the processor 180 may determine that the recognized object is not the object of interest of the target AI model.

If it is determined in step S603 that the recognized object is the object of interest of the target AI model, the processor 180 performs step S505 of determining whether the received sensor data is useful for the learning.

This means that since the received sensor data includes the object of interest of the target AI model, the received sensor data is relevant to the learning of the target AI model.

If it is determined in step S603 that the recognized object is not the object of interest of the target AI model, the processor 180 performs step S517 of classifying the received sensor data into non-training data.

As described above, if the object recognized from the received sensor data is not the object of interest of the target AI model or if there is no object recognized from the received sensor data, this means that the received sensor data is irrelevant to the learning of the target AI model.

FIG. 7 is a view illustrating an example of a classification model.

An entire domain 710 illustrated in FIG. 7 represents a feature space.

Referring to FIG. 7, the classification model is a model for distinguishing whether an object included in image data is a dog, a cat, or a horse.

The classification model may be learned by using dog image data including a label indicating that an object included in image data is a dog, cat image data including a label indicating that an object included in image data is a cat, and horse image data including a label indicating that an object included in image data is a horse.

As illustrated in FIG. 7, a domain 721 of the dog image data, a domain 722 of the cat image data, and a domain 723 of the horse image data are only part of the domain 710 of the entire image data.

However, the classification model may divide the entire domain 710 into three domains, and may classify the object included in the inputted image data into one of the dog, the cat, and the horse. That is, although the image data belonging to the domains 731, 732, and 733 except for the dog domain 721, the cat domain 722, and the horse domain 723 does not include the dog, the cat, or the horse, the classification model cannot grasp this. That is, for the image data belonging to a first animal domain 724 and a second animal domain 725 corresponding to animals other than the dog, the cat, and the horse, the classification model determines the image data as one of the dog, the cat, or the horse.

Meanwhile, according to the open set recognition model described with reference to FIG. 8, if image data out of the recognition target domain is inputted, a result indicating that an unknown object is included may be outputted.

FIG. 8 is a view illustrating an example of an open set recognition model according to an embodiment.

An entire domain 810 illustrated in FIG. 8 represents a feature space.

Referring to FIG. 8, the open set recognition model is a model for recognizing whether an object included in image data is one of a dog, a cat, a horse, or another unknown object.

The open set recognition model may be learned by using dog image data including a label indicating that an object included in image data is a dog, cat image data including a label indicating that an object included in image data is a cat, and horse image data including a label indicating that an object included in image data is a horse.

As illustrated in FIG. 8, a domain 821 of the dog image data, a domain 822 of the cat image data, and a domain 823 of the horse image data are only part of the domain 810 of the entire image data.

The open set recognition model may determine that image data belonging to the domain 831 except for the dog domain 821, the cat domain 822, and the horse domain 823 belongs to the unknown class. That is, for image data belonging to the first animal domain 824 and the second animal domain 825 corresponding to the dog, the cat, and the horse, the open set recognition model may determine that it includes an unknown object or belongs to an unknown class. Belonging to the unknown class may include the case of including an unknown object, the case of not including an object of interest, or the case of not including any objects.

Figure 9:
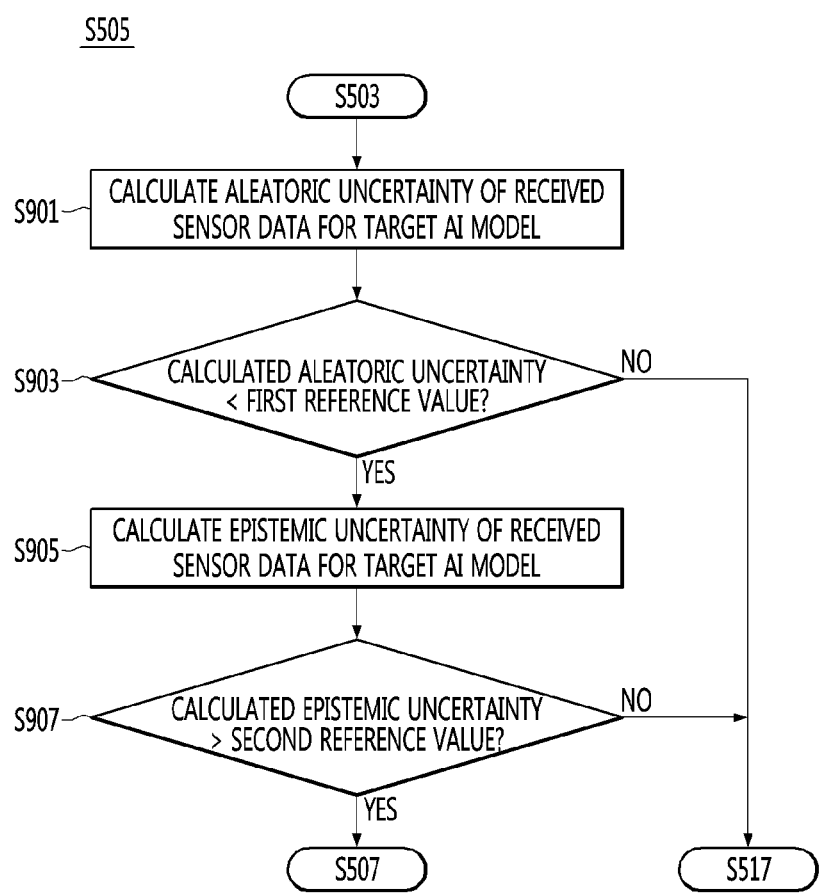
FIG. 9 is a flowchart illustrating an example of step S505 of determining whether received sensor data is useful for a learning of a target AI model illustrated in FIG. 5.

FIG. 9 is a flowchart illustrating an example of step S505 of determining whether the received sensor data is useful for the learning of the target AI model illustrated in FIG. 5.

Referring to FIG. 9, the processor 180 of the AI apparatus 100 calculates aleatoric uncertainty of the received sensor data for the target AI model (S901).

The processor 180 may generate a result from the received sensor data by using the target AI model, and determine the noise observed in the generated result as the aleatoric uncertainty of the received sensor data for the target AI model.

The processor 180 of the AI apparatus 100 determines whether the calculated aleatoric uncertainty is less than a first reference value (S903).

If it is determined in step S903 that the calculated aleatoric uncertainty is not less than the first reference value, the processor 180 performs step S517 of classifying the acquired sensor data into non-training data.

As described above, since aleatoric uncertainty refers to randomness or noise embedded in the sensor data itself, the sensor data with high aleatoric uncertainty may be bad data that may adversely affect the learning of the target AI model. Therefore, the sensor data with high aleatoric uncertainty may be classified into non-training data.

If it is determined in step S903 that the calculated aleatoric uncertainty is less than the first reference value, the processor 180 calculates epistemic uncertainty of the received sensor data for the target AI model (S905).

The processor 180 may generate a plurality of results from the received sensor data through dropout variational inference with respect to the target AI model, and determine the variance of the plurality of generated results as epistemic uncertainty of the received sensor data.

For example, the processor 180 may generate 100 dropout target AI models by performing 100 independent dropouts on the target AI model. The processor 180 may generate results from the received sensor data by using 100 dropout target AI models, calculate the variance of the generated results, and determine the calculated variance as the epistemic uncertainty of the received sensor data for the target AI model.

The processor 180 of the AI apparatus 100 determines whether the calculated epistemic uncertainty is greater than a second reference value (S907).

If it is determined in step S907 that the calculated epistemic uncertainty is not greater than the second reference value, the processor 180 performs step S517 of classifying the acquired sensor data into non-training data.

As described above, the epistemic uncertainty refers to an uncertainty caused by an incomplete model. The epistemic uncertainty is an uncertainty that can be eliminated by learning the AI model by using a large amount of data. Therefore, the sensor data with low epistemic uncertainty may be regarded as data that does not effectively affect the learning of the target AT model. That is, although the sensor data with low epistemic uncertainty does not adversely affect the learning of the target AI model, the sensor data is not useful for learning because the sensor data does not have great utility. Therefore, the sensor data with low epistemic uncertainty may be classified into non-training data.

If it is determined in step S907 that the calculated epistemic uncertainty is greater than the second reference value, the processor 180 performs step S507 of extracting a label from the received sensor data.

This means that the received sensor data is useful for the learning of the target AI model as the aleatoric uncertainty of the received sensor data for the target AI model is lower and the epistemic uncertainty of the received sensor data for the target AI model is higher. Therefore, the processor 180 performs step S507 of extracting extracts a label so as to generate training data from the received sensor data.

In some embodiments, steps S901 and S903 of calculating the aleatoric uncertainty and comparing the aleatoric uncertainty with the first reference value and steps S905 and S907 of calculating the epistemic uncertainty and comparing the epistemic uncertainty with the second reference value may be performed in parallel.

In some embodiments, steps S905 and S907 of calculating the epistemic uncertainty and comparing the epistemic uncertainty with the second reference value may be first performed, and steps S901 and S903 of calculating the aleatoric uncertainty and comparing the aleatoric uncertainty with the first reference value may be then performed.

FIG. 10 is a view for describing aleatoric uncertainty and epistemic uncertainty.

FIG. 10 shows graphs 1010 and 1020 in which results are plotted when data is inputted to the AI model. Dots in the first graph 1010 and the second graph 1020 are the plotted results corresponding to each input data.

Referring to FIG. 10, in a first area 1011 located on the right side of the first graph 1010, the results based on various data are plotted. However, it can be seen that the plotted results are far away from each other, and thus, high variance appears in the predicted results. That is, the first graph 1010 represents aleatoric uncertainty due to noise or uncertainty embedded in the data.

Meanwhile, in the second region 1021 located on the left side of the second graph 1020, the results caused by data are not plotted. Therefore, it can be seen that high variance appears in the predicted results. That is, the second graph 1020 represents epistemic uncertainty due to the lack of data used to learn the AI model.

Figure 11:
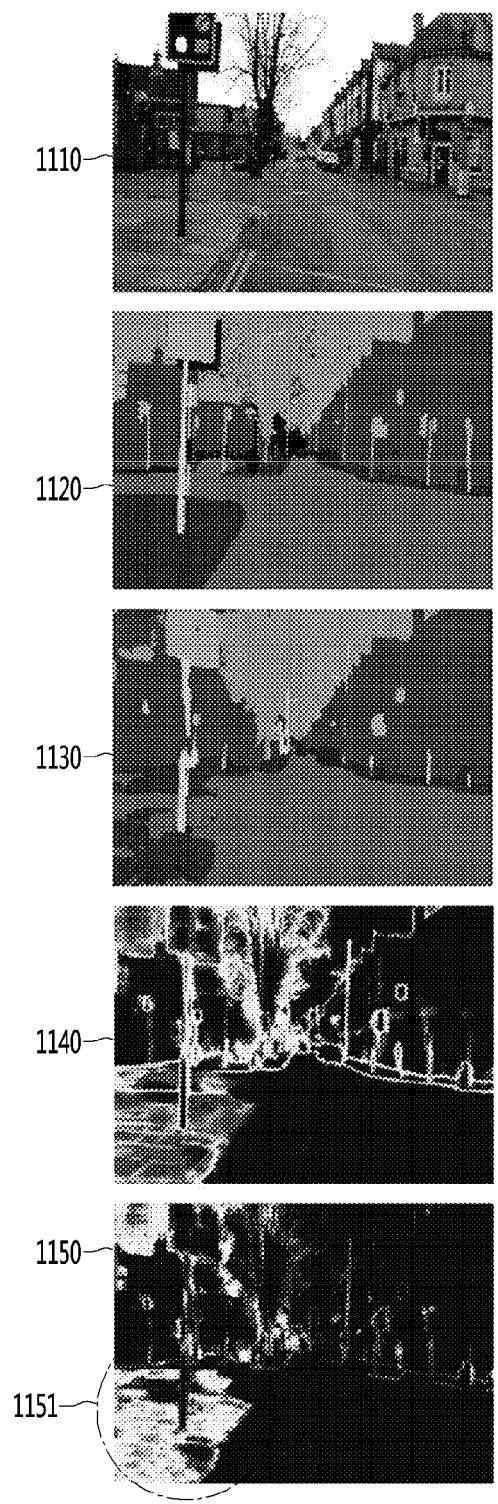
FIG. 11 is a view illustrating aleatoric uncertainty and epistemic uncertainty in a recognition result of a semantic segmentation model.

FIG. 11 is a view illustrating aleatoric uncertainty and epistemic uncertainty in a recognition result of a semantic segmentation model.

Referring to FIG. 11, the first image 1110 is image data 1110 obtained by photographing in a real environment. In the semantic segmentation model, if image data acquired by photographing in the real environment is inputted, the semantic segmentation model classifies the respective pixels included in the image data into the corresponding classes. The classes that should be segmented from the first image 1110 include roadways, sidewalks, trees, signs, columns, vehicles, people, buildings, and the like.

The semantic segmentation model differs from an instance segmentation model in that different objects of the same kind are classified into the same class. Although only recognition results of the semantic segmentation model are illustrated in FIG. 11, aleatoric uncertainty and epistemic uncertainty may be calculated even from recognition results of various models such as an instance classification model.

The second image 1120 is an image showing the actual class when semantic segmentation is performed on the first image 1110. That is, the second image 1120 is an object image or a correct answer image that the semantic segmentation model should generate from the first image 1110.

The third image 1130 is a result image generated from the first image 1110 by using the semantic segmentation model. If the third image 1130 and the second image 1120 are compared with each other, the third image 1130 and the second image 1120 are similar as a whole, but a difference occurs in some areas. This difference means that there is an error in the inference result of the semantic segmentation model.

The fourth image 1140 is a diagram showing the aleatoric uncertainty calculated for the result generated by using the semantic segmentation model. As described above, the aleatoric uncertainty refers to noise or uncertainty embedded in the data itself, and is prominent at the boundary of the object as can be seen in the fourth image 1140.

The fifth image 1150 is a diagram showing the epistemic uncertainty calculated for the result generated by using the semantic segmentation model. As described above, the epistemic uncertainty refers to an uncertainty caused by the lack of data, and is prominent in an area 1151 where objects are difficult to distinguish from each other, such as roadways and sidewalks. The epistemic uncertainty may be reduced by learning the semantic segmentation model using a large amount of data.

Figure 12:
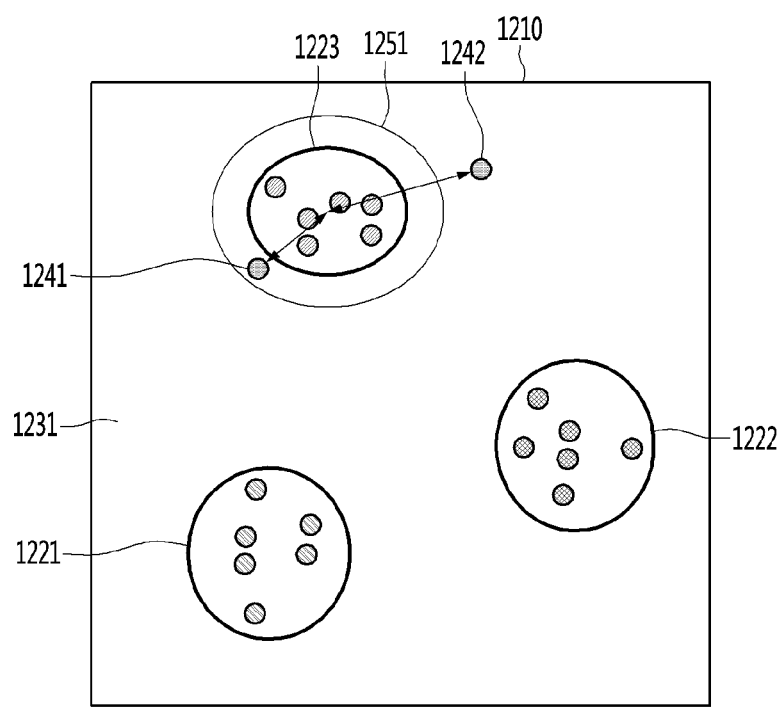
FIG. 12 is a view illustrating an example of a method for determining a confidence level of an extracted label, according to an embodiment.

FIG. 12 is a view illustrating an example of a method for determining a confidence level of an extracted label, according to an embodiment.

An entire domain 1210 illustrated in FIG. 12 represents a feature space.

Referring to FIG. 12, sensor data labeled by a user appear in clusters of the same labels in the feature space. That is, the same first labels are set to sensor labels belonging to a first domain 1221, the same second labels are set to sensor data belonging to a second domain 1222, and the same third labels are set to sensor data belonging to a third domain 1223. It is assumed that the labels are extracted from the first sensor data 1241 and the second sensor data 1242 collected in the real environment through a label extractor, and the labels extracted from the first sensor data 1241 and the second sensor data 1242 are the third label.

The processor 180 may calculate a distance from the third domain 1223 having the third label for each of the first sensor data 1241 and the second sensor data 1242 on the feature space, and may determine the confidence level of the extracted label to be higher as the calculated distance is smaller. The third labels are extracted from first sensor data 1241 and the second sensor data 1242 by label extractor, and the sensor data to which the third label is set by the user belongs to the third domain 1223. Therefore, how close each of the first sensor data 1241 and the second sensor data 1242 is to the third domain 1223 on the feature space may mean the confidence level of the label extracted by the label extractor.

If the calculated distance is smaller than a predetermined reference value, or if the determined confidence level is greater than a predetermined reference value, the processor 180 may determine that the extracted label is correct. For example, if the sensor data from which the third label is extracted is mapped within a boundary 1251 separated from the third domain 1223 by a predetermined distance in FIG. 12, the processor 180 may determine that the label is correctly extracted from the sensor data.

Figure 13:
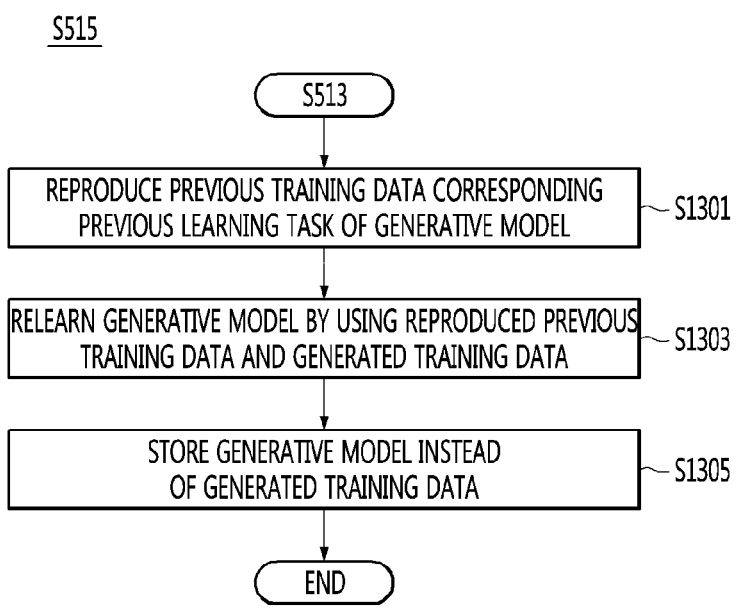
FIG. 13 is a flowchart illustrating an example of step 3515 of storing generated training data illustrated in FIG. 5.

FIG. 13 is a flowchart illustrating an example of step S515 of storing the generated training data illustrated in FIG. 5.

Referring to FIG. 13, the processor 180 of the AI apparatus 100 reproduces previous training data corresponding to a previous learning task of a generative model by using the generative model (51301).

The processor 180 of the AI apparatus 100 updates the generative model by using the reproduced previous training data and the generated training data (S1303).

Updating the generative model may mean relearning the generative model. That is, the processor 180 may relearn the previously learned generative model by using the reproduced previous training data and the generated training data.

The processor 180 of the AI apparatus 100 stores the generative model in the memory 170, instead of the generated training data (S1305).

Since the relearned generative model is capable of reproducing previous training data that was previously learned to be reproducible, and is learned to reproduce the current training data generated from the received sensor data, both the training data corresponding to the previous learning task and the training data corresponding to the current learning task may be reproduced. As such, since the generative model is capable of reproducing multiple training data with high accuracy but requires only significantly less capacity compared to the training data, the generative model is stored instead of the generated training data, thereby effectively storing the training data.

Figure 14:
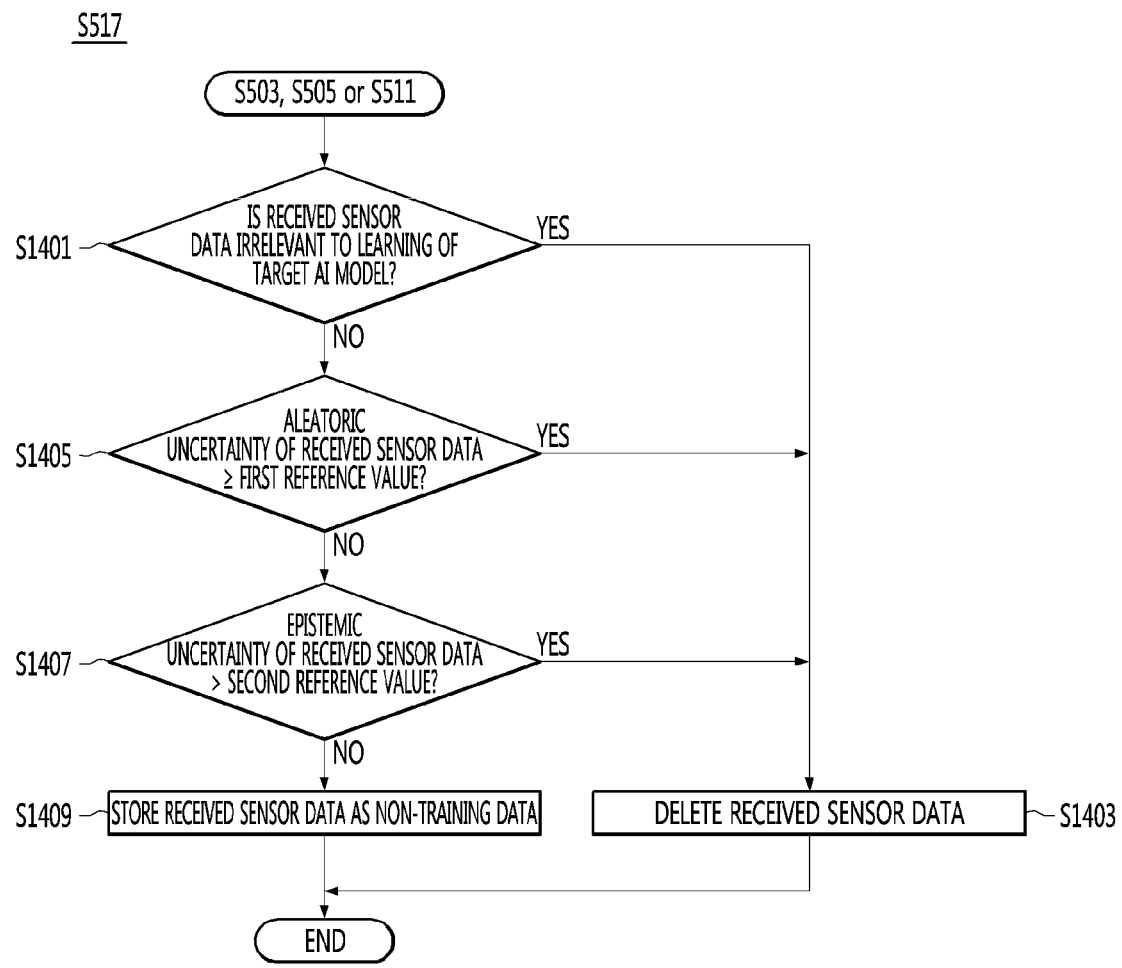
FIG. 14 is a flowchart illustrating an example of step 3517 of classifying received sensor data into non-training data illustrated in FIG. 5.

FIG. 14 is a flowchart illustrating an example of step 3517 of classifying the received sensor data into non-training data illustrated in FIG. 5.

Referring to FIG. 14, the processor 180 of the AI apparatus 100 determines whether the received sensor data is irrelevant to the learning of the target AI model (S1401).

If it is determined in step 31401 that the received sensor data is irrelevant to the learning of the target AI model, the processor 180 of the AI apparatus 100 deletes the received sensor data (S1403).

The sensor data irrelevant to the learning of the target AI model is deleted because the sensor data is not useful for the learning of the target AI model.

If it is determined in step S1401 that the received sensor data is relevant to the learning of the target AI model, the processor 180 of the AI apparatus 100 determines whether the aleatoric uncertainty of the received sensor data is greater than or equal to a first reference value (S1405).

If it is determined in step S1405 that the aleatoric uncertainty of the received sensor data is greater than or equal to the first reference value, the processor 180 of the AI apparatus 100 deletes the received sensor data (S1403).

The sensor data with high aleatoric uncertainty means high noise in itself, and is deleted because the sensor data is considered as bad data that may adversely affect the learning of the target AI model.

If it is determined in step S1405 that the aleatoric uncertainty of the received sensor data is less than the first reference value, the processor 180 of the AI apparatus 100 determines whether the epistemic uncertainty is greater than a second reference value (S1407).

If it is determined in step S1407 that the epistemic uncertainty of the received sensor data is not greater than the second reference value, the processor 180 of the AI apparatus 100 stores the received sensor data in the memory 170 as non-training data (S1409).

If both the aleatoric uncertainty and the epistemic uncertainty of the received sensor data are small, this means that the received sensor data itself is small in noise, but is a kind of data that has already been sufficiently learned in the target AI model. Therefore, even if the target AI model is learned by using the received sensor data, it does not adversely affect the learning of the target AI model, and it does not have a great effect on learning. Accordingly, the processor 180 may store the received sensor data in the memory 170 as non-training data in consideration of probability of future utilization.

If it is determined in step S1407 that the epistemic uncertainty of the received sensor data is greater than the second reference value, the processor 180 of the AI apparatus 100 deletes the received sensor data (S1403).

It is confirmed by steps S1401, S1405, and S1407 that the received sensor data is relevant to the learning of the target AI model, the aleatoric uncertainty is also less than the first reference value, and the epistemic uncertainty is also greater than the second reference value. This is the case where the confidence level of the label is not greater than the third reference value by step S511 illustrated in FIG. 5. Therefore, it means that the label generated automatically using a label classifier for the received sensor data is inaccurate. Therefore, the processor 180 may delete the sensor data from which the wrong label is extracted from the label classifier, without storing the data.

In this case, however, the received sensor data is still relevant to the learning of the target AI model, the aleatoric uncertainty is also less than the first reference value, and the epistemic uncertainty is also greater than the second reference value. Therefore, if only a label is accurately extracted from the received sensor data, it may be used as training data later. Accordingly, in another embodiment, only the received sensor data except for the extracted label may be stored in the memory 170 as non-training data.

In the above descriptions, the method by which the AI apparatus 100 generates the training data is illustrated, but the AI server 200 may also generate training data in the same manner as illustrated in FIG. 5. However, the AI server 200 does not include a sensor unit unlike the AI apparatus 100. Therefore, the training data may be generated from the sensor data received from the external devices, without generating the training data directly from the directly acquired sensor data. That is, the AI server 200 may also generate training data in the same manner as the method illustrated in FIG. 5, except that the AI server 200 receives sensor data only from the external device, unlike the AI apparatus 100.

In an embodiment in which the AI server 200 generates training data, the AI server 200 may communicate with the external device such as the AI apparatus 100, the user terminal, or the IoT apparatus, and may receive sensor data collected from the external devices in the real environment. The AI server 200 may generate training data from the received sensor data in the same manner as illustrated in FIG. 5. Except for the above-described difference, the description of the method by which the AI server 200 generates the training data is the same as the description of the method by which the AI apparatus 100 generates the training data and is thus omitted.

According to various embodiments, since training data having a high-accuracy label can be generated without user intervention, the learning of the target AI model can be automated.

In addition, according to various embodiments, unnecessary training data can be excluded by not generating the training data when it is not the learning target and does not help learning, or the label has low accuracy.

Furthermore, according to various embodiments, the training data can be effectively stored with a small capacity by storing the generative model capable of reproducing the generated training data, instead of the generated training data.

According to an embodiment of the disclosure, the above-described method may be implemented as a processor-readable code in a medium where a program is recorded. Examples of a processor-readable medium may include read-only memory (ROM), random access memory (RAM), CD-ROM, a magnetic tape, a floppy disk, and an optical data storage device.

What is claimed is:

1. An artificial intelligence apparatus for generating training data, comprising:
a memory configured to store a target artificial intelligence model; and
a processor configured to:
receive sensor data;
determine whether the received sensor data is relevant or irrelevant to a learning of the target artificial intelligence model, the received sensor data being relevant based on the received sensor data including an object of interest of the target artificial intelligence model and the received sensor data being irrelevant based on the received sensor data not including the object of interest;
generate a first result from the received sensor data by using the target artificial intelligence model;
calculate an aleatoric uncertainty regarding noise embedded in the received sensor data by determining Gaussian noise observed in the generated first result as the aleatoric uncertainty;
generate a plurality of second results from the received data by randomly activating or deactivating one or more hidden nodes included in a hidden layer of the target artificial intelligence model;
calculate an epistemic uncertainty by determining a variance of the generated second results as the epistemic uncertainty using the target artificial intelligence model with combinations of activation or deactivation of the one or more hidden nodes;
determine whether the calculated aleatoric uncertainty is less than a first reference value and the calculated epistemic uncertainty is greater than or equal to a second reference value;
extract a label from the received sensor data by using a label extractor based on a determination that aleatoric uncertainty is less than the first reference value and the epistemic uncertainty is greater than or equal to the second reference value;
determine a confidence level of the extracted label; and
generate training data including the received sensor data and the extracted label based on the determined confidence level exceeding a third reference value.

2. The artificial intelligence apparatus according to claim 1,
wherein the object of interest is an object that is identifiable or recognizable by the target artificial intelligence model.

3. The artificial intelligence apparatus according to claim 2, wherein the processor is configured to determine whether the object of interest is included in the received sensor data or whether an unknown object is included in the received sensor data, by using an open set recognition model corresponding to the target artificial intelligence model.

4. The artificial intelligence apparatus according to claim 3, wherein the processor is configured to determine that only a portion of the received sensor data, in which the unknown object is included, is irrelevant to the learning.

5. The artificial intelligence apparatus according to claim 1, wherein the processor is configured to:
determine that the received sensor data is useful for the learning if the calculated aleatoric uncertainty for the received sensor data is less than the first reference value and the calculated epistemic uncertainty for the received sensor data is greater than or equal to the second reference value.

6. The artificial intelligence apparatus according to claim 5, wherein the processor is configured to:
determine that the received sensor data is not useful for the learning if the calculated aleatoric uncertainty for the received sensor data is greater than or equal to the first reference value, and the calculated epistemic uncertainty for the received sensor data is less than the second reference value.

7. The artificial intelligence apparatus according to claim 1, wherein the processor is configured to:
calculate a distance between a position where sensor data which has the same label as the extracted label to which a label is set by a user is mapped to a feature space and a position where the received sensor data is mapped to the feature space; and
determine a confidence level of the extracted label to be higher as the distance is smaller.

8. The artificial intelligence apparatus according to claim 1, wherein the processor is configured to store, in the memory, a generative model for reproducing the generated training data, instead of the generated training data.

9. The artificial intelligence apparatus according to claim 8, wherein the processor is configured to learn the generative model by using the generated training data, and
wherein the generative model includes one of a generative adversarial network (GAN), a conditional GAN (cGAN), an auto-encoder, or a variational auto-encoder (VAE).

10. The artificial intelligence apparatus according to claim 8, wherein the processor is configured to:
reproduce previous training data corresponding to a previous learning task of the generative model by using the generative model; and
learn the generative model by using the reproduced previous training data and the generated training data.

11. The artificial intelligence apparatus according to claim 1, further comprising a sensor unit including at least one sensor,
wherein the processor is configured to receive the sensor data through the sensor unit.

12. The artificial intelligence apparatus according to claim 1, further comprising a communication unit configured to communicate with at least one external device,
wherein the processor is configured to receive the sensor data from the at least one external device through the communication unit.

13. The artificial intelligence apparatus according to claim 1, wherein the processor is configured to:
determine whether the aleatoric uncertainty of the received sensor data is greater than or equal to the first reference value; and
delete the received sensor data.

14. The artificial intelligence apparatus according to claim 1, wherein the processor is configured to:
determine whether the aleatoric uncertainty of the received sensor data is less than the first reference value and the epistemic uncertainty of the received sensor data is less than the second reference value; and
store the received sensor data in the memory as non-training data.

15. A method for generating training data, comprising:
receiving sensor data;
determining whether the received sensor data is relevant or irrelevant to a learning of a target artificial intelligence model, the received sensor data being relevant based on the received sensor data including an object of interest of the target artificial intelligence model and the received sensor data being irrelevant based on the received sensor data not including the object of interest;
generating a first result from the received sensor data by using the target artificial intelligence model;
calculating an aleatoric uncertainty regarding noise embedded in the received sensor data by determining Gaussian noise observed in the generated first result as the aleatoric uncertainty;
generating a plurality of second results from the received data by randomly activating or deactivating one or more hidden nodes included in a hidden layer of the target artificial intelligence model;
calculating an epistemic uncertainty by determining a variance of the generated second results as the epistemic uncertainty using the target artificial intelligence model with combinations of activation or deactivation of the one or more hidden nodes;
determining whether the calculated aleatoric uncertainty is less than a first reference value and the calculated epistemic uncertainty is greater than or equal to a second reference value;
extracting a label from the received sensor data by using a label extractor based on a determination that aleatoric uncertainty is less than the first reference value and the epistemic uncertainty is greater than or equal to the second reference value;
determining a confidence level of the extracted label; and
generating training data including the received sensor data and the extracted label based on the determined confidence level exceeding a third reference value.

16. A non-transitory recording medium having recorded thereon a program for performing a method for generating training data, the method comprising:
receiving sensor data;
determining whether the received sensor data is relevant or irrelevant to a learning of a target artificial intelligence model, the received sensor data being relevant based on the received sensor data including an object of interest of the target artificial intelligence model and the received sensor data being irrelevant based on the received sensor data not including the object of interest;
generating a first result from the received sensor data by using the target artificial intelligence model;
calculating an aleatoric uncertainty regarding noise embedded in the received sensor data by determining Gaussian noise observed in the generated first result as the aleatoric uncertainty;
generating a plurality of second results from the received data by randomly activating or deactivating one or more hidden nodes included in a hidden layer of the target artificial intelligence model;
calculating an epistemic uncertainty by determining a variance of the generated second results as the epistemic uncertainty using the target artificial intelligence model with combinations of activation or deactivation of the one or more hidden nodes;
determining whether the calculated aleatoric uncertainty is less than a first reference value and the calculated epistemic uncertainty is greater than or equal to a second reference value;
extracting a label from the received sensor data by using a label extractor based on a determination that the aleatoric uncertainty is less than the first reference value and the epistemic uncertainty is greater than or equal to the second reference value;
determining a confidence level of the extracted label; and
generating training data including the received sensor data and the extracted label based on the determined confidence level exceeding a third reference value.

* * * * *